United States Patent
Kiuchi et al.

(10) Patent No.: US 9,085,278 B2
(45) Date of Patent: Jul. 21, 2015

(54) STEERING WHEEL

(71) Applicant: NIHON PLAST CO., LTD., Fujinomiya-shi, Shizuoka (JP)

(72) Inventors: Yohei Kiuchi, Fujinomiya (JP); Kei Sano, Fujinomiya (JP)

(73) Assignee: NIHON PLAST CO., LTD, Shizuoka (JP)

( * ) Notice: Subject to any disclaimer, the term of this patent is extended or adjusted under 35 U.S.C. 154(b) by 0 days.

(21) Appl. No.: 14/264,920

(22) Filed: Apr. 29, 2014

(65) Prior Publication Data

US 2014/0333050 A1 Nov. 13, 2014

(30) Foreign Application Priority Data

May 7, 2013 (JP) .................... 2013-097479

(51) Int. Cl.
*B60R 21/203* (2006.01)

(52) U.S. Cl.
CPC .................... *B60R 21/2037* (2013.01)

(58) Field of Classification Search
CPC ............... B60R 21/2035; B60R 21/2037
USPC ............ 280/728.2, 731; 200/61.54, 61.55, 200/61.57
See application file for complete search history.

(56) References Cited

U.S. PATENT DOCUMENTS

| | | | | |
|---|---|---|---|---|
| 6,554,312 | B2* | 4/2003 | Sakane et al. | 280/728.2 |
| 7,097,197 | B2* | 8/2006 | Keutz et al. | 280/728.2 |
| 7,121,581 | B2* | 10/2006 | Xu et al. | 280/731 |
| 7,566,071 | B2* | 7/2009 | Tsujimoto et al. | 280/731 |
| 2004/0227332 | A1* | 11/2004 | Scherer | 280/728.2 |
| 2006/0208470 | A1* | 9/2006 | Tsujimoto et al. | 280/731 |
| 2009/0309337 | A1* | 12/2009 | Groleau et al. | 280/728.2 |
| 2010/0066062 | A1* | 3/2010 | Suzuki et al. | 280/728.2 |
| 2012/0080868 | A1* | 4/2012 | Banno et al. | 280/728.2 |
| 2012/0313357 | A1* | 12/2012 | Yamaji et al. | 280/731 |

FOREIGN PATENT DOCUMENTS

| | | |
|---|---|---|
| JP | 2007-050876 A | 3/2007 |
| JP | 2011-102052 A | 5/2011 |

* cited by examiner

*Primary Examiner* — Paul N Dickson
*Assistant Examiner* — Robert A Coker
(74) *Attorney, Agent, or Firm* — Arent Fox LLP

(57) ABSTRACT

The present invention provides a steering wheel. Hook portions configured to engagingly fit an airbag module is directly supported by a boss portion independent of spoke portions. In addition, a tip end part's side of each of hook claws in each of the hook portions is arranged so as to be oriented to the inside of a steering wheel. With such a construction, even in the case where the airbag module is pulled in such a direction as to be spaced from a steering wheel at the time of inflation and expansion of an airbag, an engaged state between each of the hook claws and an engaged portion that is provided at the airbag module is obtained as engagement at a deeper position, and the engaged state can be established to be rigid in structure.

7 Claims, 6 Drawing Sheets

STEERING WHEEL

CROSS REFERENCE TO RELATED APPLICATIONS

This application claims priority of Japanese Patent Application No. 2013-097479 filed on May 7, 2013. The contents of this application are incorporated herein by reference in their entirety.

BACKGROUND OF THE INVENTION

1. Field of the Invention

The present invention relates to a steering wheel with an airbag device accommodating an airbag for occupant at a driver's seat. It is to be noted that in this specification, upper and lower directions are respectively specified, as a top end side of the steering wheel is an upper side, and as a bottom end side is a lower side, when a steering wheel is in a neutral state in which a vehicle moves straight (i.e. a neutral position of the steering wheel), in a top view of the steering wheel. And, a direction crossing the vertical direction is defined as a transverse direction. Further, forward and backward directions are respectively specified, as a driver's side of the steering wheel is a foreside and a counter-driver's side is a backside.

2. Description of the Related Art

Conventionally and up to now, as a steering wheel of a vehicle such as an automobile, a steering wheel provided with an airbag device has been employed. The steering wheel is made of the airbag device and a wheel main body portion in a state in which the airbag device is removed. The airbag device corresponds to a module structure provided with an air bag, an inflator configured to supply an inflation gas to the airbag and a housing portion configured to house the airbag in an uninflated state.

The housing portion of the airbag device is constructed with a case body configured to accommodate a folded airbag and an inflator or the like, and a cover body that is mounted to the case body in a state in which the case body is covered therewith, the cover body being configured to cover the folded airbag. In addition, on an inner side of the cover body, a vulnerable portion which breaks when the airbag deploys is formed.

As a structure of removably supporting an airbag module by a wheel main body portion, there has been employed a structure of mounting a plate of which a lower limit position in a lower direction is specified with a stepped bolt for the airbag module, for example, and then, the mounting plate is secured to a spoke portion of the wheel main body portion.

In addition, recently, in place of the bolt-securing structure, there has been employed a snap-fit structure that is capable of engagingly fitting the airbag module to the wheel main body portion in a simplified manner. As a steering wheel provided with the snap-fit structure, there have been proposed a steering wheel provided with an airbag device (reference should be made to Japanese Unexamined Patent Application Publication No. 2007-50876), a steering wheel for automobile (reference should be made to Japanese Unexamined Patent Application Publication No. 2011-102052) or the like.

In so far as the snap-fit structure described in Japanese Unexamined Patent Application Publication No. 2007-50876 is concerned, it has been known that there is provided a structure of pressing down an airbag module placed at a predetermined position of a wheel main body portion to thereby produce an engaged state between a hook portion formed in the airbag module and an elastic wire rod disposed inside of the wheel main body portion. In addition, in so far as the snap-fit structure in Japanese Unexamined Patent Application Publication No. 2011-102052 is concerned, it has been known that there is provided a construction in which a hook portion is formed on a wheel main body portion's side and that an elastic wire rod that engages with the hook portion is arranged on a bottom face side of an airbag module.

In each of the inventions described in Japanese Unexamined Patent Application Publications No. 2007-50876 and No. 2011-102052, a spring, which is configured to bias the airbag module in such a direction as to be spaced from the inside of the wheel main body portion, and a switch mechanism for horn, are intervened between the airbag module and the inside of the wheel main body portion. In addition, the airbag module is biased by applying a biasing force from the spring in such as direction as to be spaced from the wheel main body portion, and at the most distant position from the wheel main body portion, a hook-engaged state is maintained. In this manner, the airbag module is mounted so as to be movable at a predetermined distance with respect to the wheel main body portion.

In the invention described in Japanese Unexamined Patent Application Publication No. 2007-50876, in the snap-fit structure employed for engagingly fitting the airbag module to the wheel main body portion's side, it has been known that there is provided a construction in which at least two or more hook portions are arranged on the bottom face side of the airbag module. In addition, although, at the time of deployment of the airbag, a tension force acts on the airbag module in such a direction as to be spaced from the wheel main body portion, even in the case where the tension force acts on the airbag module, the airbag module is constructed so as not to slip off from the engaged state by way of the snap-fit structure. As a constituent element for the sake of the objectiveness mentioned above, in order to prevent deformation even in the case where the tension force acts on the hook portion, the hook portion is constructed so as to be very rigid in structure.

That is, when the airbag starts its deployment, at the very first moment, the airbag module is pressed toward the wheel main body portion's side. However, after the airbag module cover has broken open, and airbag comes out from the airbag module, the airbag module is then strongly pulled in such a direction as to be spaced from the wheel main body portion, in such a manner as to be pulled up by the deployment of the airbag.

At this time, in order to prevent the airbag module from being spaced from the wheel main body portion, a construction to reliably maintain an engaged state between the hook portion and the elastic wire rod in the snap-fit structure is needed. As a structure for maintaining this engaged state, as has been described above, in Japanese Unexamined Patent Application Publication No. 2007-50876, the hook portion is constructed so as to be very rigid in structure.

In order to rigidly construct the hook portion, the shape of the hook portion becomes large in size, and moreover, a structure of the bottom side of the airbag module supporting the hook portion must be rigidly constructed as well. As a result, the weight of the hook portion and/or the weight of the airbag module increase.

In addition, in the case where the shape of the hook portion is formed large in size, a variety of restrictions must be applied to a layout or a construction for attaching the airbag module into the wheel main body portion. Thus, the snap-fit structure in Japanese Unexamined Patent Application Publication No. 2007-50876 results a disadvantageous structure in various points of view.

The invention in Japanese Unexamined Patent Application Publication No. 2011-102052, which was filed by the same Applicant of the present application, is directed to a construction in which the hook portion is provided at the spoke portion. Therefore, unlike the hook portion as described in Japanese Unexamined Patent Application Publication No. 2007-50876, even in the case where the hook portion and the bottom part of the airbag module are not constructed so as to be rigid in structure, the hook portion is supported by the spoke portion, thus making it possible to reliably maintain the engaged state with the airbag module.

SUMMARY OF THE INVENTION

The present invention has been achieved in order to solve the conventional problems, and it is an object of the present invention to provide a steering wheel provided with a construction that is capable of further reliably maintaining an engaged state with an airbag module at the time of deployment of an airbag by carrying out a further modification to such snap-fit structure as in Japanese Unexamined Patent Application Publication No. 2011-102052.

The above mentioned object of the present invention can be achieved according to each of first to fourth aspects of the present invention as follows. That is, a steering wheel according to the first aspect of the present invention is primarily provided, and includes a steering wheel provided with: a wheel main body portion including a rim portion arranged at a rotation outer circumferential portion, a boss portion arranged inside of the rim portion and coupled to a steering shaft, and a plurality of spoke portions configured to couple the rim portion and the boss portion to each other; and an airbag module configured to cover at least the boss portion and house an airbag therein, wherein a module support portion configured to support the airbag module includes: a hook portion provided at the wheel main body portion; and an engaged portion provided on a bottom face side of the airbag module and engages with the hook portion, the hook portion has a leg portion supported by the boss portion independent of the spoke portion, and a hook claw provided on a top side of the leg, and a tip end of the hook claw protruding toward an inside of the wheel main body portion.

The steering wheel according to the second aspect of the present invention is primarily provided in such a manner that the engaged portion is made of an elastic wire rod.

The steering wheel according to the third aspect of the present invention is primarily provided in such a manner that an easily deformable portion configured to easily incline a tip end side of the hook claw to the inside of the wheel main body portion is formed at the leg portion.

The steering wheel according to the fourth aspect of the present invention is primarily provided in such a manner the hook portion is provided on two or more sites of the wheel main body portion.

According to any one of the first to fourth aspects of the present invention, a hook portion constituting a snap-fit structure is formed on a wheel main body portion's side, and moreover, the hook portion is constructed so as to be directly supported by a boss portion by way of a leg portion provided independent of a spoke portion. That is, a hook claw of the hook portion, which is provided on a top side of the leg portion, is mounted to the boss portion in a cantilever-supported state.

In typical steering wheels, when an impact load is applied to a rim portion, a spoke portion in a certain range from a proximal end part coupled to a boss portion to a joint portion coupled to the rim portion is constructed so as to be able to absorb the impact lead by a torsion or a bending deformation. In accordance with the present invention, the hook portion is supported on the boss portion independent from the spoke portion and thus the hook portion is not influenced by the deformation of the spoke portion. Moreover, the leg portion of the hook portion is directly supported by the boss portion, and thus, even in the case where an impact load is applied to the rim portion, a base part of the leg portion is rigidly supported by the boss portion.

Thus, according to any one of the first to fourth aspects of the present invention, when an airbag deploys, even in the case where a tension force acts on an airbag module in such a manner as to release from a wheel main body portion, the tension force mentioned above acts as a force of deforming a leg portion so as be inclined to the inside of the wheel main body portion. In this manner, a hook claw produces a deformation toward the inside of the wheel main body portion, and the engaged state between the engaged portion and the hook claw is further enhanced.

That is, the hook claw is deformed toward the inside of the wheel main body portion, whereby the engaged portion is made more deep engaged state with the hook claw, and the engaged state between the engaged portion and the hook claw is further enhanced. As a result, a state in which the airbag module is retained is caused to be more rigid in tightness.

Thus, according to any one of the first to fourth aspects of the present invention, the airbag module can be reliably retained. In addition, the hook portion can be arranged on an appropriate site as required without being limited to a layout or a construction of the spoke portion.

According to any one of the first to fourth aspects of the present invention, the engaged portion can be constructed by employing an elastic wire rod. With such a construction, when the airbag module is engaged with the hook portion, the engaged state can be easily established by deformation of the elastic wire rod. In addition, when the hook portion is deformed to the inside of the wheel main body portion by applying the tension force from the engaged portion when the airbag inflates and expands, the base side of the hook claw is established in a state in which the base side is caused to be proximal to the elastic wire rod by inclination of the hook claw, and thus, the engaged state between the engaged portion and the hook portion can be more reliably maintained.

According to any one of the first to fourth aspects of the present invention, the easily deformable portion is formed at the leg portion, whereby when the airbag deploys, deformation of the hook portion to the inside of the wheel main body portion can be increased.

According to any one of the first to fourth aspects of the present invention, the hook portion can be formed on at least two or more sites inside of the wheel main body portion. In order to engage the airbag module with the wheel main body portion in a well-balanced manner, there is a need to provide the engaged portion on at least two or more sites of the airbag module. In addition, the engaged portion is provided on at least two or more sites, whereby, even at the time of deployment of the airbag, the airbag module can be reliably engagingly fitted to the wheel main body portion.

BRIEF DESCRIPTION OF THE DRAWINGS

FIG. 3 (a) and FIG. 3 (b) are sectional views taken along the line A-A and the line B-B of FIG. 2 respectively (according to the first embodiment);

FIG. 8 (a) and FIG. 8 (b) are sectional views taken along the line C-C and the line D-D of FIG. 8 respectively (according to the second embodiment)

DESCRIPTION OF THE PREFERRED EMBODIMENTS

Hereinafter, embodiments of the present invention will be specifically described with reference to the accompanying drawings. In so far as a construction of a steering wheel of the present invention is concerned, any layout, shape or construction other than layouts, shapes or constructions which will be described hereinafter can be changed as long as it is possible to solve the problem to be overcome by the present invention. Thus, the present invention is not limited to the embodiments which will be described hereinafter, and a variety of modifications to the described embodiments can occur without deviating from the scope and/or spirit of the invention.

[First Embodiment]

Figure 1:
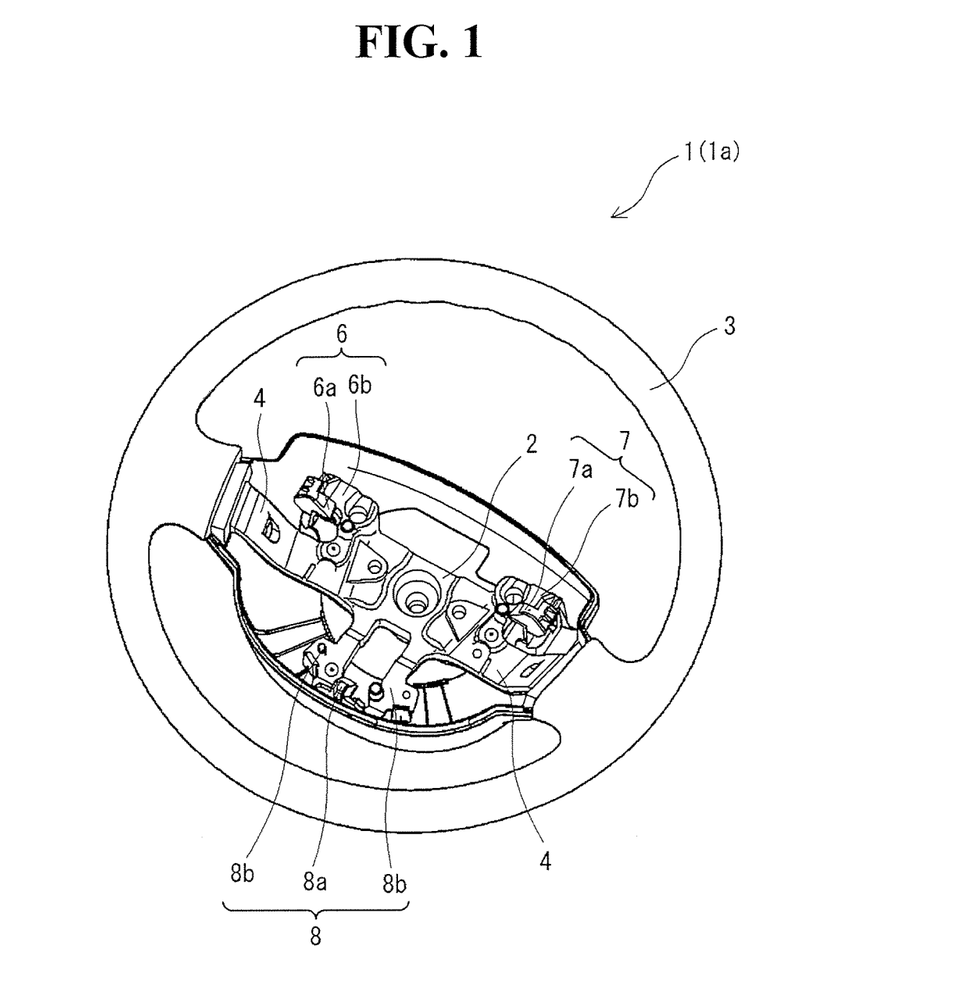
FIG. 1 is a perspective view of a steering wheel in which an airbag module is removed (according to a first embodiment)

A first embodiment according to the present invention will be described with reference to FIG. 1 to FIG. 6. As shown in FIG. 1, a steering wheel 1 is provided with a rim portion 3 that is formed in a circular ring, for example, and the rim portion 3 is generally arranged in a state in which an upper end part of the rim portion is inclined against a forward direction of a vehicle with respect to a lower end part. In addition, the steering wheel 1 is attached to a steering shaft serving as a steering device, not shown, and an airbag module 5 (reference should be made to FIG. 4) that constitutes a main body portion of an airbag device is attached to an occupant's side of the steering wheel 1 at a center of the rim portion 3.

Figure 4:
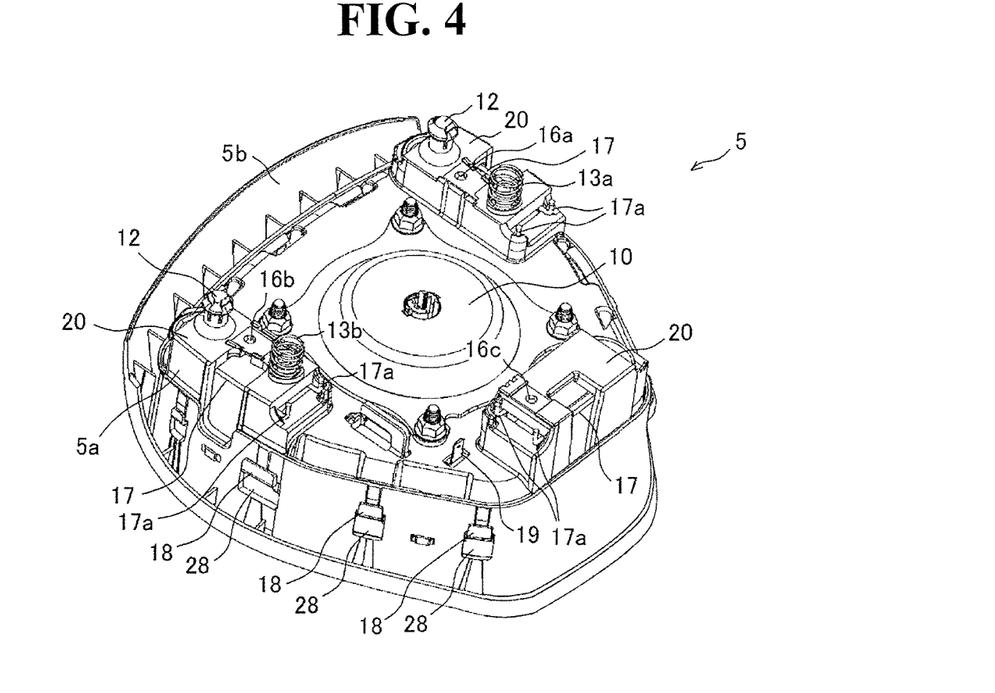
FIG. 4 is a perspective view of a back side of an airbag module (according to the first embodiment)

As shown in FIG. 1 and FIG. 4, the steering wheel 1 is constructed with a boss portion 3 having a shaft mounting hole 23 that is coupled to the steering shaft, not shown, the rim potion 3 that is gripped by a driver, and spoke portions 4, 4 configured to connect the boss portion 2 and a core bar of the rim portion 3 to each other. In the example shown, this steering wheel is constructed with two spokes serving as the spoke portions 4, 4.

The boss portion 2 can be covered at the occupant's side with the airbag module 5 shown in FIG. 4, and can also be covered at each of the spoke portions 4, 4, together, with the airbag module 5. At this time, a gap can be provided between an outer circumferential edge of the airbag module that covers both of the boss portion 2 and the spoke portions 4, 4, and an inner side of the rim portion 3.

By the presence of this gap, the airbag module 5 can be relatively moved to the rim 3 in a forward or backward direction. In this manner, the airbag module 5 that is also act as a horn switch button can be moved in the forward or backward direction.

It is to be noted that, although not shown, there can also be employed a construction in which a gap between a site existing on the side of the rim portion 3 and the airbag module 5 is covered with a finisher. In this case, there is a need to provide a predetermined gap between the outer circumferential edge of the airbag module 5 and an inner side of the finisher, and with this gap, the airbag module 5 can be constructed so as to be relatively movable to the finisher. In addition, on a face of the finisher, a desired design can be made, or alternatively, switches or the like can be arranged as required.

Figure 2:
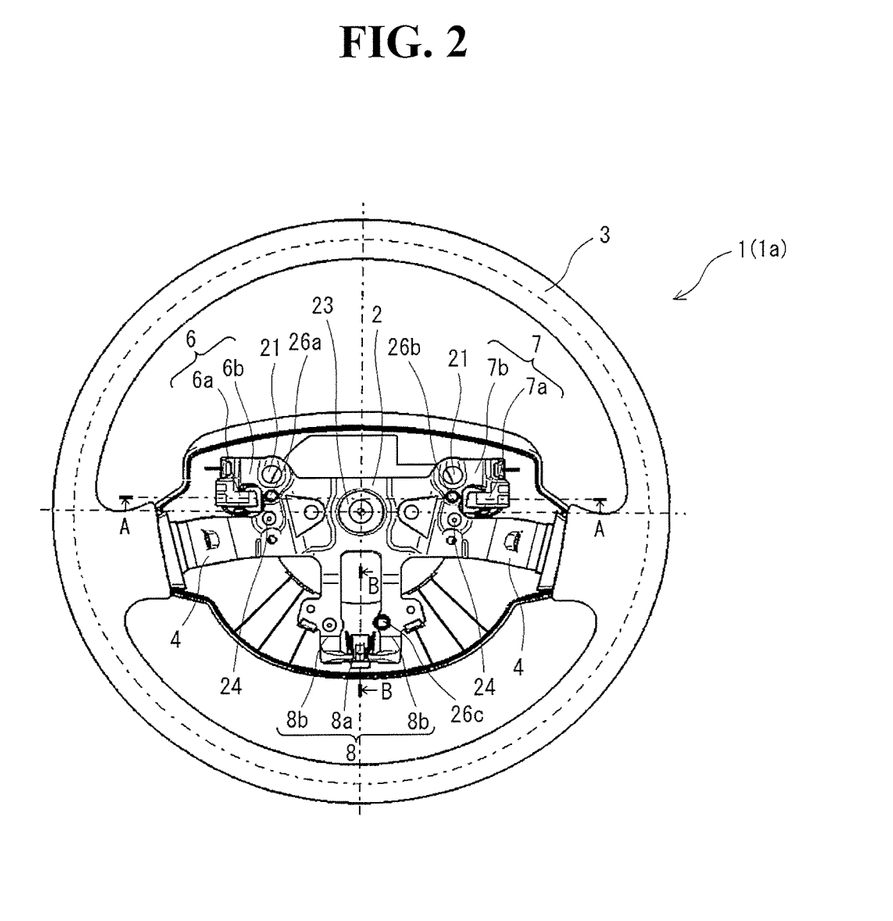
FIG. 2 is a plan view of a steering wheel in which a steering pad is removed (according to the first embodiment)

As shown in FIG. 2, in the boss portion 2, a shaft mounting hole 23 for attaching to the sheering shaft, not shown, is formed. On an inner circumferential face of the shaft mounting hole 23, an inner tooth spline is formed, and this inner tooth spline is spline-coupled to an outer tooth spline that is formed on an outer circumferential face of the steering shaft, not shown, whereby a wheel main body portion 1a can be mounted to the spline shaft, not shown.

Inside of the steering wheel 1, an undercover 30 configured to cover a back side of the wheel main body portion 1a is provided. In addition, support portions 24a, 24b configured to support end parts of springs 13a, 13b (reference should be made to FIG. 4) that elastically support an airbag module 5 which will be described later are respectively constructed, and in proximity to a site constituting each of the support portions 24a, 24b, fixed contact points 26a to 26c constituting a horn switch mechanism are constructed among movable contact points 16a to 16c (reference should be made to FIG. 4) that are provided on the side of the airbag module 5.

In addition, the wheel main body portion 1a is constructed with a pin engagement hole 21 configured to insert a positioning pin 12 (reference should be made to FIG. 4) that is formed in each of fixed boards 20 of the airbag module 5, and hook portions 6 to 8 configured to engagingly fit the airbag module 5 to the wheel main body portion 1a in such a state as to allow for a slight movement in such a direction as to be spaced from the wheel main body 1a.

The hook portions 6 to 8 are provided independent of the spoke portions 4, 4, and are directly supported by the boss portion 2. Although, in the example shown, there is illustrated a construction in which the hook portions 6 to 8 are provided on three sites of the boss portion 2 as long as there is employed a layout or a construction that is capable of mounting the airbag module 5 in a well-balanced manner, the hook portions can be constructed on two sites.

The hook portions 6 to 8 are respectively constructed with leg portions 6b to 8b supported by the boss portion 2, and hook claws 6a to 8a formed on top sides of the respective leg portions 6b to 8b. In addition, a tip end side of each of the leg portions 6a to 8a is laid out and constructed so as to be oriented to the inside of the wheel main body portion 1a, and an inclined face is formed on a top face.

Figure 3:
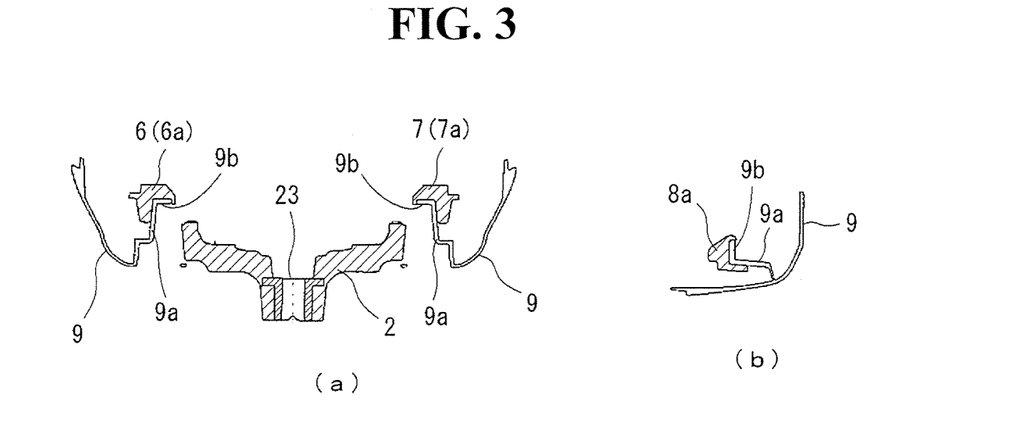

As shown in FIG. 3 (a) which is a sectional view taken along the line A-A of FIG. 2, hook portions 6, 7 are constructed with leg portions 6b, 7b and hook claws 6a, 7a. In addition, as shown in FIG. 3 (b) which is a sectional view taken along the line B-B of FIG. 2, a hook portion 8 is constructed with one pair of leg portions 8b, 8b and a hook claw 8a.

First, a construction of the hook portions 6, 7 will be described with reference to FIG. 2 and FIG. 3 (a). The leg portions 6b, 7b of the hook portions 6, 7 are formed along the spoke portions 4, 4, and are arranged independent of the spoke portions 4, 4 on sites which are more proximal to the rim portion 3 than the spoke portions 4, 4. On the top sides of the leg portions 6b, 7b, hook portions 6a, 7a are respectively formed, and the arrangement positions of the hook portions 6a, 7a are arranged on the side of the spoke portions 4, 4 that are more proximal than the leg portions 6b, 7b.

Although the hook claws 6a, 7a can also be constructed so as to be arranged outside of the spoke portions 4, 4, these hook claws can be compactly formed by being arranged on the side of the spoke portions 4, 4. As shown in FIG. 3 (*a*), the tip end part of each of the hook claws 6*a*, 7*a* is formed so as to protrude toward the inside of the wheel main body portion 1*a*, and an inclined face, which is inclined to the inside, is formed on a top face.

The undercover 9 made of a synthetic resin, configured to cover the back face side of the wheel main body portion 1*a*, is extended toward the hook portions 6, 7, and is arranged on each of the back face sides of the hook portions of the hook claws 6*a*, 7*a* while a tip end part in a respective extension portion 9*a* is defined as an engagement face 9*b*. The engagement face 9*b* can come into contact with an elastic wire rod 17 serving as an engaged portion 17 that is provided at the airbag module 5 which will be described later. (Hereinafter, a further description will be continued, assuming that the elastic wire rod 17 is employed in place of using a term "engaged portion".)

Next, a construction of the hook portion 8 will be described with reference to FIG. 2 and FIG. 3 (*b*). At the hook portion 8, one pair of leg portions 8*b*, 8*b* is provided, and a proximal end part of such one pair of leg portions 8*b*, 8*b* is supported by the boss portion 2. The tip end part's side of each of the leg portions 8*b*, 8*b* is coupled to an appropriate portion, and at this coupled portion, a tip end of the hook claw 8*a* is formed so as to be oriented to the side of the shaft mounting hole 23. The hook portion 8 is constructed with such one pair of leg portions 8*b*, 8*b* and the hook claw 8*a*.

As shown in FIG. 3 (*b*) which is a sectional view taken along the line B-B of FIG. 2, the undercover 9 made of a synthetic resin, configured to cover the back side of the wheel main body portion 1*a*, is extended toward the hook portion 8, and is arranged on the back side of the hook claw 8*a* while a tip end part of the extension portion 9*a* is defined as the engagement face 9*b*. The engagement face 9*b* can come into sliding contact with the elastic wire rod 17 that is provided at the airbag module 5 which will be described later.

At the time of engagement, the elastic wire rod 17 is guided to an appropriate engagement position in a state in which the wire rod comes into sliding contact with the engagement face 9*b*, thus causing a spring steel material constituting the elastic wire rod 17 to be smoothly guided by way of a synthetic resin material (for example, polypropylene) constituting the undercover 9. In addition, in the case where the elastic wire rod 17 directly comes into sliding contact with the hook portions 6 to 8 made of a metal material due to a vibration at the time of cruising of a vehicle, an annoying noise such as a squeak noise occurs, and however, the elastic wire rod 17 comes into sliding contact with the engagement face 9*b* in such a fashion that the back sides of the hook claws 6*a*, 7*a*, 8*a* are covered by a synthetic resin, thus making it possible to restrain or prevent an occurrence of such an annoying noise. Further, a gap between the elastic wire rod 17 and the hook claws 6*a*, 7*a*, 8*a* can be in electrically insulated state.

It is to be noted that, although in the example shown, a construction employing one pair of leg portions 8*b*, 8*b* is illustrated, for example, one leg portion is arranged on a site which is an intermediate position of one pair of leg portions 8*b*, 8*b* as illustrated and then a hook claw 8*a* can be constructed so as to be provided at such one leg portion as well.

In addition, the core bar of the rim portion 3, the boss portion 2, the spoke portion 4, and the hook portions 6 to 8 can be integrally molded with the use of an aluminum alloy or a magnesium alloy or the like.

Next, a construction of the airbag module 5 will be described with reference to FIG. 4. In order to support the airbag module 5 that also functions as a horn pad with the use of a spring force, a plurality of springs 13*a*, 13*b* are arranged between the back side of the airbag module 5 and the boss portion 2. Although in the example shown, there is illustrated a construction in which two springs 13*a*, 13*b* are provided, it is also possible to employ a construction in which a spring receptacle is formed in proximity to the hook portion 8 of FIG. 2, and the airbag module 5 is supported by three springs.

The airbag module 5 is provided with a case body 5*a*, an inflator 10 that is mounted to this case body 5*a*, a not shown air bag, to which an inflation gas from the inflator 10 is to be supplied and a cover body 5*b* that engages with the case body 5*a*. Also, an airbag, not shown, is accommodated in a space made of the case body 5*a* and the cover body 5*b*. In addition, a vulnerable portion that breaks upon deployment of the airbag is formed on an inner surface of the cover body 5*b*.

An engagement claw 18 that is formed at the case body 5*a* is engaged with an engagement hole 28 that is formed in an outer circumferential surface of the cover body 5*b*, and the cover body 5*b* is engaged with the case body 5*a* by engaging means, not shown, whereby the cover body 5*b* can be mounted to the case body 5*a*.

On the back side of the case body 5*a*, that is, on an upper upper side face in FIG. 4, movable contact points 16*a* to 16*c* of a horn switch mechanism are provided, and all of the movable contact points 16*a* to 16*c* are connected to a terminal chip portion 19. The terminal chip portion 19 can be connected to a connector, not shown, which is provided at the wheel main body portion 1*a*, when the airbag module 5 is attached to the wheel main body portion 1*a*. This connector is connected to a lead wire of a horn device, not shown.

On the back side of the case body 5*a*, a fixed board 20 for arranging the movable contact points 16*a* to 16*c* is formed, and on three sites in the back face side of the case body 5*a*, the fixed boards 20 are respectively formed. In addition, on each of the fixed boards 20, movable contact points 16*a* to 16*c* are respectively provided, and in the example shown, one end parts of the springs 13*a*, 13*b* are respectively supported on two fixed board 20, and a positioning pin 12 is provided.

The positioning pin 12 can engage with a pin engagement hole 21 (reference should be made to FIG. 2) that is formed in the wheel main body portion 1*a* when the airbag module 5 is attached to the wheel main body portion 1*a*, thereby enabling positioning of each of the springs 13*a*, 13*b* and positioning between the movable contact points 16*a* to 16*c* and fixed contact points 26*a* to 26*c*.

It is to be noted that, although, as springs 13*a*, 13*b*, a coil spring that functions as a compression spring is used, as long as capable of biasing the airbag module 5 in such a direction as to be spaced from the wheel main body portion 1*a*, there can also be used other types of springs such as a plate spring instead.

Between the airbag module 5 and the wheel main body portion 1*a*, a module support portion is constructed so as to engagingly stop the airbag module 5 with respect to the wheel main body portion 1*a* in a state in which a movement in a forward or backward direction has been permitted. The module support portion constitutes a snap-fit structure, and is constructed with the engaged portion 17 that is formed at the airbag module 5 and the hook portions 6 to 8 that is formed at the wheel main body portion 1*a*.

The engaged portion 17 is also referred to as a "one-touch" quick attachment type wire, and is formed in such a shape that the elastic wire rod 17 such as a spring steel material is curved in a U-shape, and each end part 17*a* of the elastic wire rod 17 that is curved in the U-shape is bent to one side so that the end parts 17*a* are arranged in parallel to each other. In addition, by pressing the end parts 17*a* of the elastic wire rod 17 in a direction in which a gap between these end parts is reduced in size, this wire rod can be elastically deformed so that a widthwise dimension of the elastic wire rod 17 that is curved in the U-shape decreases. Thus, the elastic wire rod 17 is elastically deformed, whereby the elastic wire rod 17 can be inserted between one pair of elongated holes that is formed in the fixed board 20, or alternatively, can be removed from the inserted elongated holes.

One pair of elongated holes configured to insert the elastic wire rod 17 is formed in each of the fixed boards 20, and is arranged in a state in which these elongated holes are spaced from an insertion direction of the engaged portion 17. In addition, the engaged portion 17 can be mounted in such one pair of elongated holes by reducing a pressing force that is applied in the direction in which the gap between both end parts 17a in a state in which the engaged portion 17 is inserted into such one pair of elongated holes. At this time, a part of the elastic wire rod 17 is arranged in a state in which the part is exposed to a spaced portion between such one pair of elongated holes. This part of the elastic wire rod 17 that is exposed between such one pair of elongated holes engages with a respective one of the hook portions 6 to 8 that are formed on the side of the wheel main body portion 1a.

It is to be noted that, although in the example shown, there is illustrated a construction employing two springs 13a, 13b to support the airbag module at two points, the number of such springs is not limited to two.

The number and positions of springs are, if constant intervals between a respective one of the fixed contact points 26a to 26c formed at the wheel main body portion 1a in the horn switch mechanism 8, and a respective one of the movable contact points 16a to 16c on the side of the airbag module 5 can be made, and if the airbag module 5 can be supported in a well-balanced manner, two or more springs can be used and then arranging these springs at their appropriate arrangement positions is possible.

In addition, the number of arrangements and the arrangement positions in respective ones of the fixed contact points 26a to 26c and the movable contact points 16a to 16c constituting the horn switch mechanism are not limited to the construction in the example shown. As long as these positions are suitable for actuating the horn switch mechanism when the airbag module 5 is pressed, the horn switch mechanism can be arranged at any position. The case body 5a and the undercover 30 each are made of a hard synthetic resin such as a glass fiber reinforced polyamide, a talc containing polypropylene or an ABS resin materials by injection molding.

Next, transition of the engaged state between an elastic wire rod 17 and a hook portion 8 upon deployment of an airbag will be described with reference to FIG. 5 and FIG. 6. It is to be noted that similar transition of an engaged state between the elastic wire rod 17 and hook portions 6, 7 occur as is the case with the engaged state between the elastic wire rod 17 and the hook portion 8, and therefore, the engaged state between the elastic wire rod 17 and the hook portion 8 will be described as a representative example. In addition, ease for understanding for the contents of the description, the layouts and constructions of the elastic wire rod 17 and the hook portion 8 will be schematically illustrated. Thus, a construction of the airbag module 5 and a construction of the spoke portion 4, or alternatively, the illustrations of the extension portion 9a, the engagement face 9b or the like of the undercover 9 are omitted.

Figure 5:
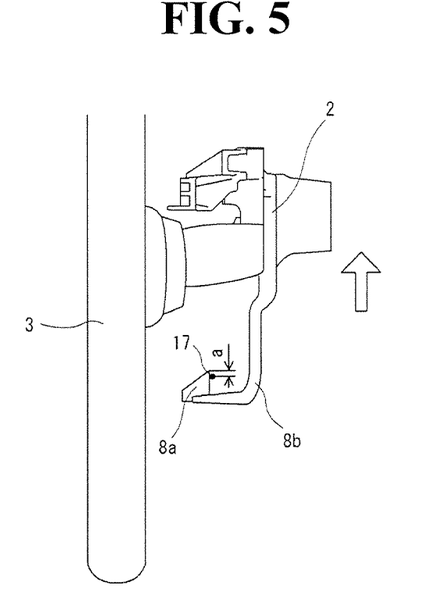
FIG. 5 is a partial schematic view showing an engagement between an engaged portion and a hook portion (according to the first embodiment)

FIG. 5 shows a state in which the airbag module 5 is attached to the wheel main body portion 1a and then the elastic wire rod 17 that slides on an inclined face of the hook claw 8a engages with a tip end of the hook claw 8a. The elastic wire rod 17 enhances a spring force while sliding on the inclined face of the hook claw 8a and while changing its relative position in such a direction as to decrease a gap between the end parts 17a of the elastic wire rod 17 formed in the U-shape mentioned above.

Even in the case where the elastic wire rod 17 exceeds the tip end part of the hook claw 8a, an elastic force having been accumulated in the U-shape is restored, and its relative position is then changed in the direction in which the gap between the end parts 17a of the elastic wire rod 17 increases in size. In addition, as shown in FIG. 5, its relative position is shifted to the inside by a distance of "a" from a tip end of the hook claw 8a, and in this state, the elastic wire rod 17 can engage with the hook claw 8a.

Figure 6:
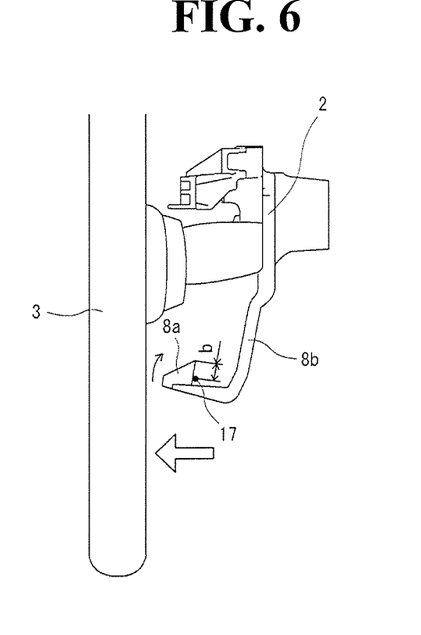
FIG. 6 is a partial schematic view showing an engagement between an engaged portion and a hook portion upon deployment of an airbag (according to the first embodiment)

In this state of above described engagement, when the airbag deploys, a tension force acts on the airbag module 5 in such a direction as to be spaced from the wheel main body portion 1a as indicated by the arrow in FIG. 6. Due to the tension force acting on the airbag module 5 at this time, the hook claw 8a that is supported in a cantilever state by the leg portions 8b, 8b is pulled in the direction indicated by the arrow via the elastic wire rod 17.

In this manner, the leg portions 8b, 8b configured to support the hook claw 8a are deformed to the inside of the wheel main body portion 1a, the engaged position between the elastic wire rod 17 and the hook claw 8a moves to an inward position at a distance of "b" from the tip end of the hook claw 8a. That is, the elastic wire rod 17 engages with the hook claw 8a at a deeper position. That is, although a distance from the tip end part of the hook claw 8a to its related engaged position was defined as being equal to "a" in the case of FIG. 5, the hook claw 8a can be inclined to the inside of the steering wheel 1 so that a distance of "b (>a)" is defined in FIG. 6.

Thus, when the airbag deploys, the elastic wire rod 17 engages with the hook claw 8a more rigidly, and the airbag module 5 can be reliably engagingly fitted to the wheel main body portion 1a. With a construction of the leg portions 6b to 8b, the hook claws 6a to 8a are easily inclined to the inside of the steering wheel 1 by applying the tension force from the airbag module 5 at the time of deployment of the airbag, thus making it possible to form an easily deformable portion at the leg portions 6b to 8b.

Although the easily deformable portion is capable of inclining the leg potions 6b to 8b so as to increase inclination of the hook claws 6a to 8a when a tension force acts on the leg portions 6b to 8b, this deformable portion can be constructed so as to produce a breakage or the like of the leg portions 6b to 8b. In addition, the easily deformable portion can be formed by changing the widthwise dimension or thickness in the leg portions 6b to 8b, can be formed by increasing the lengthwise dimension of the leg portions 6b to 8b, or alternatively, can be formed by bent corner portions.

It is to be noted that, although FIG. 6 shows a state in which the leg portion 8b is greatly inclined, this inclined state is illustrated in an exaggerated manner in order to better understand deformation of the hook claw 8a. Although the amount of deformation of the leg portion 8b can be constructed so as to be small according to the rigidity of the leg portion 8b, even in the case where the amount of deformation is small, the hook claw 8a is always inclined to the inside of the wheel main body portion 1a, and advantageous effects of the present invention can be sufficiently attained.

[Second Embodiment]

Figure 7:
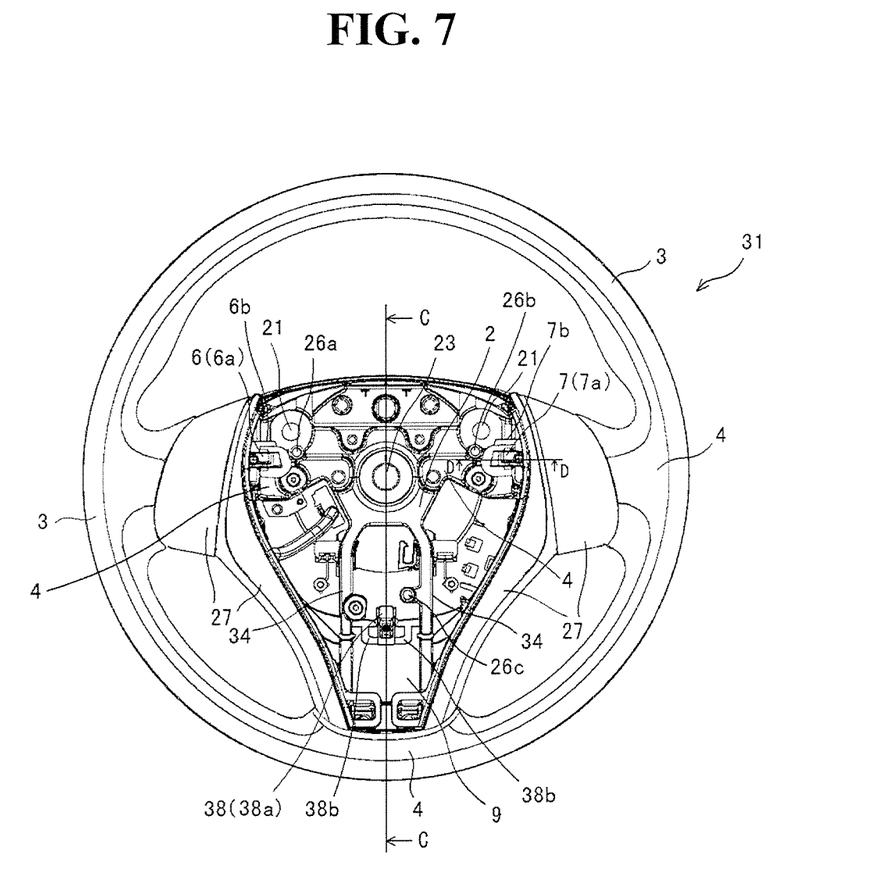
FIG. 7 is a plan view of a steering wheel in which a steering pad is removed (according to a second embodiment)
Figure 8:
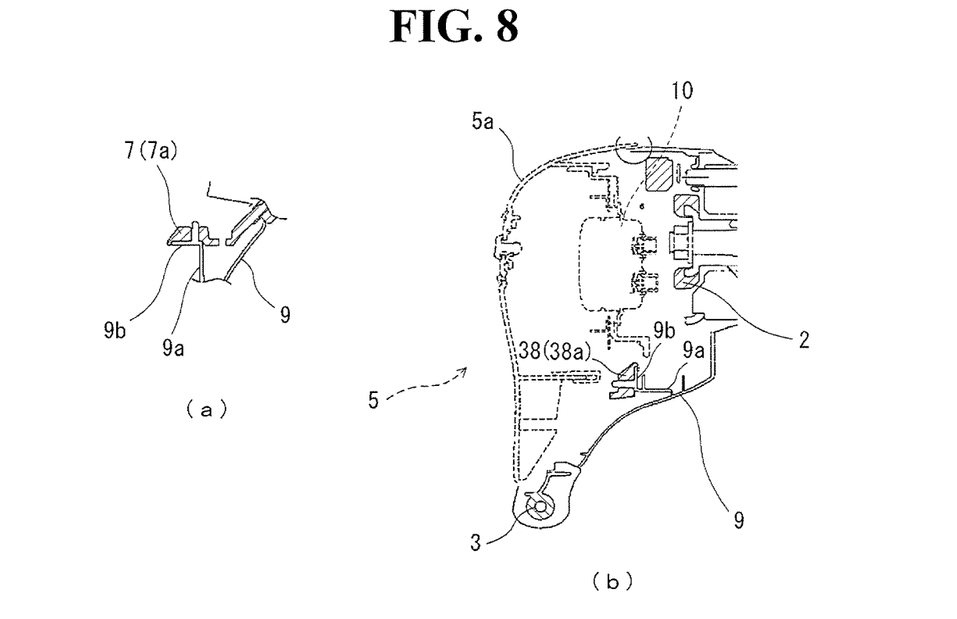

While the first embodiment was described with respect to the construction of two spokes, as a construction of the spoke portions 4, a construction of three spokes can also be employed as shown in FIG. 7 and FIG. 8. Hereinafter, as a construction of a second embodiment, a construction of a steering wheel 1 provided with three spokes will be described. However, the present invention can be preferably applied to a steering wheel 1 provided with three or more spoke portions as well.

In a second embodiment, like constituent elements in the first embodiment are designated by like reference numerals in the first embodiment, and a duplicate description of such constituent elements is omitted. In the second embodiment, there is employed a construction in which one more spoke portion 34 than the number of spoke portions employed in the first embodiment is added. In addition, the spoke portions 34 are constructed as one pair of spoke portions 34, 34, on a lower side of the steering wheel 31, a boss portion 2 and a core bar of a rim portion 3 are coupled to each other, and one pair of left and right spoke portions is constructed while a hook portion 38 is sandwiched between these spoke portions. Further, springs 13a to 13c, which are configured to elastically bias an airbag module 5 from a lower side, are provided on three sites.

The spoke portions 34, 34 are constructed with the core bar of the rim portion 3 and the boss portion 2 which are integrally molded with the use of an aluminum alloy or a magnesium alloy or the like. A part of spoke portions 4, 4 and the spoke portions 34, 34 are covered with one pair of left and right finishers 27. In addition, the boss portion 2 and each of the spoke portions 4, 4, 34, 34 are covered with an airbag module 35 shown in FIG. 9.

Figure 9:
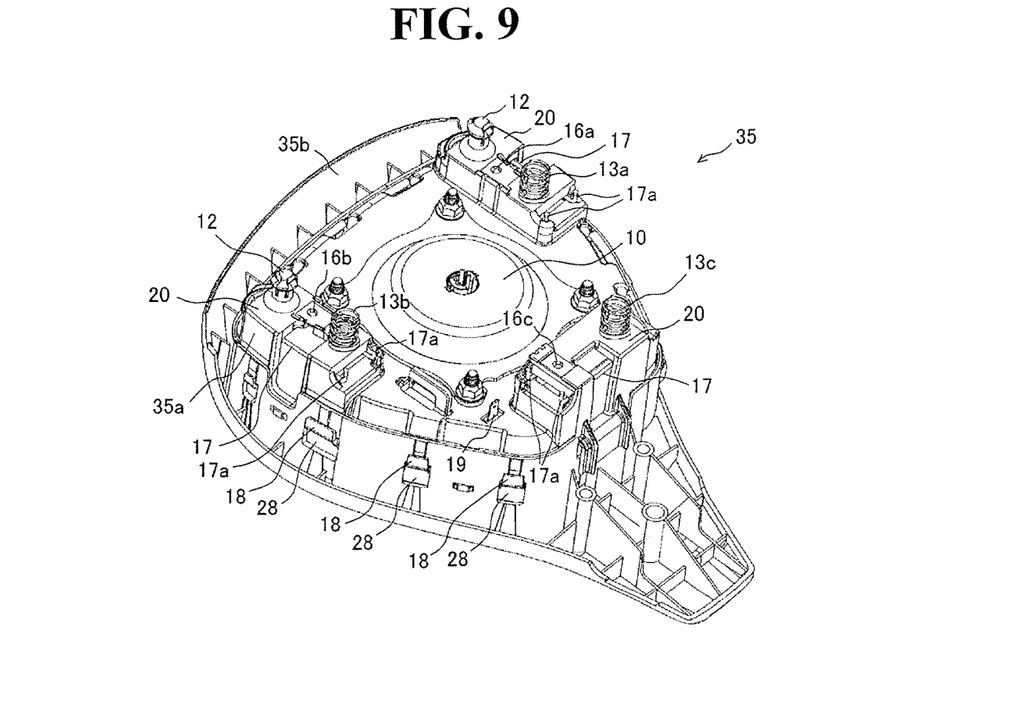
FIG. 9 is a perspective view of a back side of an airbag module (according to the second embodiment).

As shown in FIG. 9, the airbag module 35 is made of: a case body 35a and a cover body 35b that is mounted to the case body 35a via an engagement claw 18, and the case body 35a is constructed with movable contact points 16a to 16c and springs 13a to 13c or the like. In addition, an elastic wire rod 17 is provided as an engaged portion configured to engage the airbag module 35 with a respective one of hook portions 6, 7, 38 of a steering wheel 31 is provided.

A predetermined gap is formed between an outer circumferential edge side of the airbag module 35 and an interior face side of one pair of finishers 27, and the airbag module 35 is constructed so as to relatively movable to the finishers 27. In addition, a desired design can be made on each of side faces of each of the finishers 27. Further, on a top face of each of finishers 25, switches or the like can also be arranged as required.

As shown in FIG. 7 and FIG. 8 (*b*) which is a sectional view taken along the line C-C of FIG. 7, a hook portion 38 is arranged between one pair of spoke portions 34, 34, and is constructed so as to be directly supported by a boss portion 2. The hook portion 38 is constructed with one pair of leg portions 38b, 38b, a proximal end part of which is supported by the boss portion 2, and a hook claw 38a that is mounted to a coupling portion configured to couple a tip end part's side of each of the leg portions 38b, 38b, and a tip end of the hook claw 38a is formed so as to be oriented to the side of a shaft mounting hole 23.

As shown in FIG. 8 (*a*) which is a sectional view taken along the line D-D of FIG. 7, as described with reference to the first embodiment, an engagement face 9b that is formed at a tip end part in an extension portion 9a of an undercover 9 is arranged on a back face side of the hook claw 7a in the hook portion 7.

As shown in FIG. 9, the airbag module 35 is constructed so that a part of the cover body 5b is extended to a lower side of the steering wheel 31 so as to cover a gap between the hook portion 38 and the rim portion 3. In addition, when the airbag module 35 is attached to the steering wheel 31, the elastic wire rod 17 that is provided on the extension side of the cover body 5b, as described above, engages with the hook portion 38, enabling elastic wire rods 17, 17, which are provided at the left and right in an upper side of FIG. 9, to engage with hook portions 6, 7, respectively.

Thus, in accordance with the present invention, the hook portions 6 to 8, 38 are constructed separately from the spoke portions 4, 4, 34, 34, and thus, even in the case where an impact load acts on the rim portion 3 of the steering wheels 1, 31, this rim portion is not influenced by the spoke portions 4, 4, 34, 34 that are deformed by absorption of such an impact load. In addition, at the time of deployment of an airbag, the hook claws 6a to 8a, 38a are deformed so as to be inclined to the inside of the steering wheels 1, 31, and thus, an engaged state with the elastic wire rod 17 that is an engaged portion is reliably maintained.

INDUSTRIAL APPLICABILITY

According to the present invention, a concept of the present invention can be preferably applied to a steering wheel that is capable of applying the concept of the present invention.

What is claimed is:

1. A steering wheel comprising:
   a wheel main body portion including
      a rim portion arranged at a rotation outer circumferential portion,
      a boss portion arranged inside of the rim portion and coupled to a steering shaft, and
      a plurality of spoke portions configured to couple the rim portion and the boss portion to each other; and
   an airbag module configured to cover at least the boss portion and to accommodate an airbag therein,
   wherein a module support portion configured to support the airbag module includes:
   a hook portion provided at the wheel main body portion; and
   an engaged portion provided on a bottom face side of the airbag module that engages with the hook portion of the wheel main body portion,
   the hook portion has a leg portion supported by the boss portion independent of the spoke portion, and a hook claw provided on a top side of the leg, and
   a tip end of the hook claw is formed so as to protrude toward an inside of the wheel main body portion.

2. The steering wheel according to claim 1, wherein the engaged portion is made of an elastic wire rod.

3. The steering wheel according to claim 1, wherein an easily deformable portion configured to easily incline a tip end side of the hook claw is formed at the leg portion.

4. The steering wheel according to claim 1, wherein the hook portion is provided on two or more sites of the wheel main body portion.

5. The steering wheel according to claim 1, wherein the engaged portion is mounted to the bottom face side of the airbag module between a pair of elongated holes.

6. The steering wheel according to claim 5, wherein a part of the engaged portion is exposed to a spaced portion between the pair of elongated holes.

7. The steering wheel according to claim 1, wherein the leg portion extends from the boss portion toward the airbag module.

* * * * *